(12) United States Patent
Ishiguro et al.

(10) Patent No.: US 6,230,517 B1
(45) Date of Patent: May 15, 2001

(54) ABSORPTION COOLING APPARATUS

(75) Inventors: Katsusuke Ishiguro; Akira Maruyama; Hiroshi Kamiya, all of Nagoya (JP)

(73) Assignee: Paloma Industries Limited, Nagoya (JP)

( * ) Notice: Subject to any disclaimer, the term of this patent is extended or adjusted under 35 U.S.C. 154(b) by 0 days.

(21) Appl. No.: 09/351,287

(22) Filed: Jul. 12, 1999

(30) Foreign Application Priority Data

Jul. 13, 1998 (JP) .................................................. 10-214843

(51) Int. Cl.[7] .................................................. F25B 15/00
(52) U.S. Cl. ................ 62/476; 62/494; 62/484; 62/141
(58) Field of Search .............................. 62/141, 476, 484, 62/494

(56) References Cited

U.S. PATENT DOCUMENTS

| | | | | |
|---|---|---|---|---|
| 1,952,214 | * | 3/1934 | Nelson | 62/484 |
| 2,073,651 | * | 3/1937 | Randel | 62/484 |
| 2,230,917 | * | 2/1941 | Triana | 62/484 |
| 2,248,178 | * | 7/1941 | Kuenzli | 62/484 |
| 3,273,350 | * | 9/1966 | Taylor | 62/484 |
| 4,791,790 | | 12/1988 | Tongu . | |
| 4,872,319 | | 10/1989 | Tongu . | |
| 5,794,456 | | 8/1998 | Ishiguro et al. . | |

FOREIGN PATENT DOCUMENTS

| | | |
|---|---|---|
| 1-134177 | 5/1989 | (JP) . |
| 10-26437 | 1/1998 | (JP) . |

* cited by examiner

*Primary Examiner*—William Doerrler
*Assistant Examiner*—Mark Shulman
(74) *Attorney, Agent, or Firm*—Oliff & Berridge PLC.

(57) ABSTRACT

Lower and upper limit float switches 15a and 15b for detecting the liquid level in high-temperature separator 14, orifice portion 18 and float-associated valve V1 parallel to the orifice portion are provided, with the orifice portion being provided on circulation pipe K2 extending from the gas-liquid separator in a position either upstream or downstream of high-temperature heat exchanger 17. The float-associated valve is closed when the liquid level drops to the lower limit thereof and it is opened when the liquid level rises to the upper limit thereof. During normal operation of the cooling apparatus, the flowing of steam from the gas-liquid separator into the heat exchanging unit can be prevented to ensure smooth passage of the solution. In a diluting operation, the head of the gas-liquid separator suffices to ensure an adequate flow of the solution in spite of the small pressure difference, thereby assuring the diluting operation to proceed smoothly.

4 Claims, 7 Drawing Sheets

ABSORPTION COOLING APPARATUS

BACKGROUND OF THE INVENTION

The present invention relates to an absorption cooling apparatus that is used as an outdoor machine for an absorption air conditioning system and which cools the heat transfer medium used to activate the cooling operation of an indoor air conditioner.

Among the known absorption cooling apparatuses is the one that is described in the Unexamined Japanese Patent Application Publication No. Hei 10-26437 and which is applied to an absorption air conditioning system. This absorption cooling apparatus uses water as a refrigerant and lithium bromide as an absorbent. The general layout of the cooling apparatus is shown in FIG. 8 and comprises the following components: a high-temperature generator having a fin-and-tube heat exchanger 112 which uses the heat of combustion from a burner 111 to heat an aqueous solution of lithium bromide (which is hereunder referred to simply as either a low-concentration solution, a medium-concentration solution or a high-concentration solution depending upon the concentration of lithium bromide), or a low-concentration absorbing liquid supplied from a solution pump 150; a gas-liquid separator 113 for high-temperature generator (which is hereunder referred to simply as a high-temperature separator) with which the low-concentration solution heated with the high-temperature generator 110 is separated into steam and a medium-concentration solution; a low-temperature generator 120 with which the medium-concentration solution being sent to a fin-and-tube heat exchanger 121 is heated with the steam separated in the high-temperature separator 113; a gas-liquid separator 122 for low-temperature generator (which is hereunder referred to simply as a low-temperature separator) with which the heated medium-concentration solution is separated into steam and a high-concentration solution; a condenser 130 which cools the steam from the low-temperature separator 122 to liquefy; an evaporator 141 which evaporates the water condensed in the condenser 130 and the low-temperature generator 120; and an absorber 142 that allows the steam from the evaporator 141 to be absorbed by the high-concentration solution.

The evaporator 141 and the absorber 142 have a dual pipe structure consisting of a cold water pipe 160 extending from an indoor cooler (not shown) surrounded with a coaxial outer pipe 140 and they are formed integrally with an evaporating/absorbing compartment 143 formed between the cold water pipe 160 and the outer pipe 140. The absorber 142 is connected to the high-temperature generator 110 via a solution circulating path K on which are provided the following three components: the solution pump 150 which supplies in circulation a low-concentration solution to the high-temperature generator 110; a low-temperature heat exchanger 151 which performs heat exchange with the high-concentration solution being sent from the low-temperature separator 122; and a high-temperature heat exchanger 152 which performs heat exchange with the medium-concentration solution being sent from the high-temperature separator 113. A pressure reducing valve 114 is provided on the solution circulating path extending from the high-temperature heat exchanger 152 to the low-temperature generator 120.

This absorption cooling apparatus operates as follows in a cooling mode. The solution pump 150 starts to operate and the burner 111 ignites, whereupon the low-concentration solution flowing through the fin-and-tube heat exchanger in the high-temperature generator 110 is heated to generate steam, which is separated from the medium-concentration solution in the high-temperature separator 113. The medium-concentration solution has the temperature thereof lowered in the high-temperature heat exchanger 152 and is thereafter supplied into the low-temperature generator 120. As it flows through the fin-and-tube heat exchanger in the low-temperature generator 120, the medium-concentration solution is reheated by the steam from the high-temperature separator 113 and enters the low-temperature separator 122, where it is separated into steam and the high-concentration solution. The high-concentration solution has the temperature thereof lowered in the low-temperature heat exchanger 151 and is thereafter dripped on the inner surface of the outer pipe 140. The steam is cooled to condense in the condenser 130 and dripped on the outer surface of the cold water pipe 160 in the evaporating/absorbing compartment 143. The dripping water evaporates under the low pressure in the evaporating/absorbing compartment 143 and cools the water flowing through the cold water pipe 160 by depriving it of the heat equivalent to the heat of vaporization; the resulting cold water circulates through the cold water pipe 160 and is directed to the indoor cooler to perform a cooling operation. The high-concentration solution absorbs the water vapor (steam) to become a low-concentration solution which is forced by the solution pump 150 to pass through the low-temperature heat exchanger 151 and the high-temperature heat exchanger 152, so that the temperature thereof is raised; thereafter, the low-concentration solution is sent to the high-temperature generator 110.

The above-described absorption cooling apparatus has various problems. If a pressure reducing means such as an orifice is not provided between the high-temperature separator 113 and the low-temperature generator 120, the pressure difference between the two components will increase during normal operation of the cooling apparatus and steam flows into the high-temperature heat exchanger 152, making it impossible to perform appropriate heat exchange, thus upsetting the balance in the refrigeration cycle to interfere with the appropriate operation. Another problem is that if the pressure reducing means such as an orifice is the only element that is provided between the high-temperature separator 113 and the low-temperature generator 120, the head of the high-temperature separator 113 is not sufficient to assure the appropriate flow of the solution during a diluting operation, a start-up period or other stages where only small pressure difference exists between the two components. The same difficulty occurs between the low-temperature separator 122 and the low-temperature heat exchanger 151. A further problem arises with the low-temperature separator 122: due to the high concentration of the solution formed therein, lithium bromide tends to crystallize out if the solution stays for a long period. The reducing pressure valve 114 provided in the conventional absorption cooling apparatus is not capable of accommodating the variations in pressure difference.

SUMMARY OF THE INVENTION

The present invention has been accomplished in order to solve the aforementioned problems. It is a first object of the invention to provide an absorption cooling apparatus that maintains an appropriate level of pressure difference between a gas-liquid separator and a high-temperature or low-temperature heat exchanger during normal operation and which yet is capable of ensuring a sufficient flow of solution from the gas-liquid separator during a diluting operation. A second object of the invention is to provide an absorption cooling apparatus that is capable of preventing the solute of an absorbing liquid from crystallizing out within the gas-liquid separator.

The first object of the invention can be attained by the absorption cooling apparatus according to aspect 1 which comprises a pump for supplying in circulation an absorbing liquid of high refrigerant content, a generator for heating the absorbing liquid supplied from the pump, a gas-liquid separator with which the absorbing Liquid heated with the generator is separated into an absorbing liquid of low refrigerant content and a refrigerant vapor, a heat exchanging unit for performing heat exchange between the absorbing liquid separated by the gas-liquid separator and the absorbing liquid which is yet to flow into the generator, a cooling section in which the liquid refrigerant obtained by liquefying the refrigerant vapor is dispensed onto the outer surface of a heat transfer medium circulating pipe so that the latter is cooled by the evaporation of the liquid refrigerant, and an absorbing section in which the absorbing liquid of low refrigerant content supplied from the generator is dispensed to absorb the resulting refrigerant vapor, characterized in that said absorption cooling apparatus further includes a solution quantity adjusting means by which the quantity of the absorbing liquid flowing out of the gas-liquid separator is adjusted in accordance with the quantity of the solution therein.

If the quantity of the absorbing liquid flowing out of the gas-liquid separator is adjusted in accordance with the quantity of the solution therein, the components downstream of the gas-liquid separator can be held as if they were liquid sealed so that entrance of steam into the heat exchanging unit is effectively prevented to ensure smooth progress of heat exchange therein.

The first object of the invention can also be attained by the absorption cooling apparatus according to aspect 2 which comprises a pump for supplying in circulation an absorbing liquid of high refrigerant content, a generator for heating the absorbing liquid supplied from the pump, a gas-liquid separator with which the absorbing liquid heated with the generator is separated into an absorbing liquid of low refrigerant content and a refrigerant vapor, a heat exchanging unit for performing heat exchange between the absorbing liquid separated by the gas-liquid separator and the absorbing liquid which is yet to flow into the generator, a cooling section in which the liquid refrigerant obtained by liquefying the refrigerant vapor is dispensed onto the outer surface of a heat transfer medium circulating pipe so that the latter is cooled by the evaporation of the liquid refrigerant, and an absorbing section in which the absorbing liquid of low refrigerant content supplied from the generator is dispensed to absorb the resulting refrigerant vapor, characterized in that said absorption cooling apparatus further includes a liquid level detecting means for detecting the level of the liquid within the gas-liquid separator, an orifice portion on an absorbing liquid passageway extending from the gas-liquid separator which is provided either upstream or downstream of the heat exchanging unit, an on-off valve provided parallel to the orifice portion, and an on-off valve control means which controls the on-off valve in such a way that it is closed when the liquid level detecting means detects the lower limit of the liquid level whereas it is opened when the upper limit of the liquid level is detected.

If the pressure difference between the gas-liquid separator and the heat exchanging unit is small as at start-up, it is difficult for an adequate amount of the absorbing liquid to flow through the orifice portion and the liquid level in the gas-liquid separator rises until the liquid level detecting means detects the upper limit of the liquid level, whereupon the on-off valve is opened by the on-off valve control means. As a result, an adequate amount of the absorbing liquid flows through the on-off valve channel and the liquid level lowers. If the liquid level detecting means later detects the lower limit of the liquid level, the on-off valve is closed by the on-off valve control means. This causes the absorbing liquid to flow only through the orifice portion. As the cooling apparatus operation approaches a stable state, the alterations of the liquid level become less abrupt and eventually a balance is attained between the resistance of the orifice portion, the liquid flow initiated by the pressure difference and the liquid flow forced by the pump, whereupon the liquid level is held constant. The liquid level therefore assures a complete liquid seal within the pipes and smooth heat exchange is effected in the heat exchanging unit without entrance of steam. It should be particularly noted that if the orifice portion is provided downstream of the heat exchanging unit, pressure reduction is effected after heat exchange and this makes it difficult for the absorbing liquid to evaporate. What is more, the absorbing liquid that has been subjected to heat exchange has a low enough temperature to increase the durability of the on-off valve.

During a diluting operation of the cooling apparatus, the pressure difference decreases and so does the flow of the absorbing liquid through the orifice portion. This causes the liquid level in the gas-liquid separator to increase and the liquid level detecting means detects the increased liquid level, whereupon the on-off valve control means opens the on-off valve. As a result, the absorbing liquid flows through the open conduit and, in spite of the small pressure difference, the head of the gas-liquid separator suffices to assure an adequate flow of the absorbing liquid that enables the diluting operation of the cooling apparatus to proceed smoothly.

The first object of the invention can also be attained by the absorption cooling apparatus according to aspect 3 which comprises a pump for supplying in circulation an absorbing liquid of high refrigerant content, a generator for heating the absorbing liquid supplied from the pump, a gas-liquid separator with which the absorbing liquid heated with the generator is separated into an absorbing liquid of low refrigerant content and a refrigerant vapor, a heat exchanging unit for performing heat exchange between the absorbing liquid separated by the gas-liquid separator and the absorbing liquid which is yet to flow into the generator, a cooling section in which the liquid refrigerant obtained by liquefying the refrigerant vapor is dispensed onto the outer surface of a heat transfer medium circulating pipe so that the latter is cooled by the evaporation of the liquid refrigerant, and an absorbing section in which the absorbing liquid of low refrigerant content supplied from the generator is dispensed to absorb the resulting refrigerant vapor, characterized in that said cooling apparatus further includes a float moving up and down in response to the variations in the level of the absorbing liquid in the gas-liquid separator and an outlet plugging valve which is operatively associated with the float to close the absorbing liquid outlet of the gas-liquid separator when the level of the absorbing liquid has dropped to the lower limit thereof.

If the pressure difference between the gas-liquid separator and the heat exchanging unit increases during normal operation of the cooling apparatus, the liquid level in the gas-liquid separator decreases to the lower limit thereof, whereupon the float moves down and the outlet plugging valve in operative association with the float closes the absorbing liquid outlet. As a result, the flowing of steam from the gas-liquid separator into the heat exchanging unit is effectively prevented to assure the progress of adequate heat exchange. During a diluting operation, the pressure difference decreases and the outlet plugging valve is opened accordingly; hence, in spite of the low pressure difference, the head of the gas-liquid separator suffices to assure an adequate flow of the absorbing liquid that enables the diluting operation of the cooling apparatus to proceed smoothly.

The second object of the invention can be attained by the absorption cooling apparatus according to aspect 6 which is a modification of the absorption cooling apparatus of aspect 3 in that a gap through which the absorbing liquid leaks is provided in that part of the absorbing liquid outlet portion which contacts the outlet plugging valve.

Even if the outlet plugging valve closes the absorbing liquid outlet, the gap in said outlet allows for a slight amount of the absorbing liquid to flow out. As a result, no part of the absorbing liquid will stay for a long enough time to cause crystallization of lithium bromide which is the solute of the absorbing liquid of low refrigerant content. As a further advantage, the absorbing liquid outlet is not fully closed so that only a small force is necessary to open the absorbing liquid outlet by releasing the outlet plugging valve.

DETAILED DESCRIPTION OF THE PREFERRED EMBODIMENTS

Figure 1:
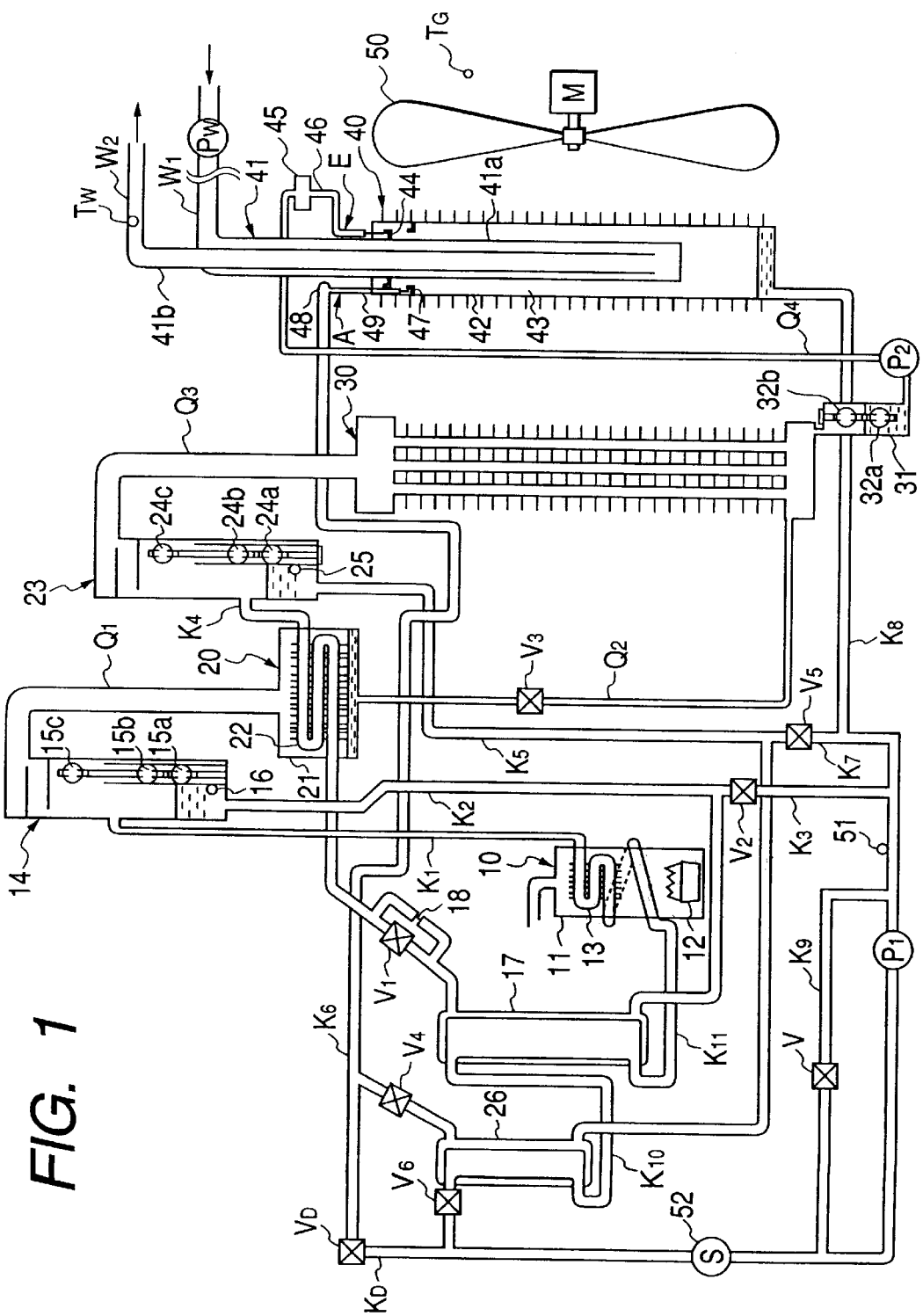
FIG. 1 is a diagrammatic representation of an absorption cooling apparatus according to the first embodiment of the present invention.

We now describe several embodiments of the invention with reference to accompanying drawings, among which FIG. 1 shows the general layout of an absorption cooling apparatus according to a first embodiment which is installed outdoors for cooling the heat transfer medium in an indoor cooler.

The absorption cooling apparatus shown in FIG. 1 has the following basic elements: a high-temperature generator 10 which uses the heat of combustion from a burner 12 to heat a solution of lithium bromide which is a low-concentration absorbing liquid; a high-temperature separator 14 by which the low-concentration solution heated in the high-temperature generator 10 is separated into steam and a medium-concentration solution; a low-temperature generator 20 by which the medium-concentration solution being sent from the high-temperature separator 11 via a high-temperature heat exchanger 17 is reheated by the steam sent from the high-temperature separator 14; a low-temperature separator 23 by which the medium-concentration solution heated in the low-temperature generator 20 is separated into steam and a high-concentration solution; a condenser 30 by which the steam being sent from the low-temperature separator 23 is cooled to liquefy; a dual pipe unit 40 which cools the heat transfer medium for cooling purposes by evaporating the water being sent from the condenser 30 and which also allows the resulting steam to be absorbed by the high-concentration solution being sent from the low-temperature separator 23 via a low-temperature heat exchanger 26; a cooling fan 50 for cooling the dual pipe unit 40 and the condenser 30; and a solution pump P1 with which the low-concentration solution from the dual pipe unit 40 is sent to the high-temperature generator 10 after the temperature thereof has been raised by heat exchange in the low-temperature heat exchanger 26 and the high-temperature heat exchanger 17. The individual elements are interconnected by pipes. For more specific information about the individual elements, see below.

The high-temperature generator 10 has a fin-and-tube heat exchanger 13 (which is hereunder referred to as a heat exchanger) that is contained in a housing 11 and heated with the burner 12 so that the solution of lithium bromide flowing through the tubes is efficiently heated. The high-temperature separator 14 is connected to the high-temperature generator 10 via a circulation pipe K1 and it has the following three float switches: a lower limit float switch 15a for detecting the lower limit of the liquid level; an upper limit float switch 15b for detecting the upper limit of the liquid level; and a stop float switch 15c that is provided above the upper limit float switch 15b for detecting the critical liquid level. When the stop float switch 15c turns on, a control unit 60 either lowers the liquid flow through the solution pump P1 or shuts down the cooling apparatus so that the absorbing liquid will not flow into the refrigerant channel. Provided within the high-temperature separator 14 is a liquid temperature sensor 16 for detecting the temperature of the medium-concentration solution contained in the separator 14.

A circulation pipe K2 for circulating the solution from the high-temperature separator 14 is connected via the high-temperature heat exchanger 17 to a fin-and-tube heat exchanger 22 to be described below (which is hereunder referred to as a heat exchanger) that is provided in the low-temperature generator 20. The high-temperature heat exchanger 17 performs heat exchange between the hot medium-concentration solution from the high-temperature separator 14 that flows externally (on the drawing) and the cold low-concentration solution being supplied from the solution pump P1 that flows internally (on the drawing).

An orifice portion 18 and a float-associated valve V1 are provided parallel to each other on the circulation pipe k2 between the high-temperature heat exchanger 17 and the low-temperature generator 20. The pressure of the solution passing through the orifice portion 18 is reduced to create a higher pressure difference across the orifice portion 18 so that the liquid level in the high-temperature separator 14 is held at a sufficient height to provide a liquid seal. The float-associated valve V1 is a solenoid valve that is operatively associated with the float switches 15a and 15b in the high-temperature separator 14 such that it is closed when the lower limit float switch 15a turns off by detecting the level of the internal medium-concentration solution having dropped to the lower limit whereas it is opened when the upper limit float switch 15b turns on by detecting the liquid level having reached the upper limit. In other words, if the pressure difference between the high-temperature separator 14 and the low-temperature generator 20 increases, the flow of the absorbing liquid counteracting the resistance of the orifice portion 18 approaches the flow being sent from the pump P1 and the absorbing liquid mainly passes through the orifice portion 18. As a result, the change in the liquid level of the high-temperature separator 14 decreases gradually and the action of the float-associated valve V1 decreases. If the pressure difference decreases, the amount of the absorbing liquid flowing through the orifice portion 18 also decreases and the resulting increase in the liquid level contributes to increase the action of the float-associated valve V1 so that the absorbing liquid mainly flows through the channel in the float-associated valve V1.

Provided on the circulation pipe K2 at a site upstream of the high-temperature heat exchanger 17 is an overflow pipe K3 that branches from the circulation pipe K2 to combine with and connect to a circulation pipe K8 to he described below (the term "upstream" is hereunder used to describe the side from which the solution flows and the term "downstream" is used to describe the side to which the solution flows). The overflow pipe K3 is provided with an overflow valve V2 that opens or closes the conduit; when the overflow valve V2 opens, the solution will no longer overflow the high-temperature separator 14.

The low-temperature generator 20 has a fin-and-tube heat exchanger 22 contained in a housing 21, to which is connected a pipe Q1 serving as a path for the steam from the high-temperature separator 14. The solution of lithium bromide flowing through the heat exchanger 22 is heated with the steam supplied from the high-temperature separator 14 via the pipe Q1. Connected to the bottom of the housing 21 is a pipe Q2 through which the water collecting within the housing 21 is sent to the bottom of the condenser 30 and which is provided with a valve V3 that works as an orifice to create a pressure difference between the low-temperature generator 20 and the condenser 30.

The low-temperature separator 23 is connected via a circulation pipe K4 to a site downstream of the heat exchanger 22. The low-temperature separator 23 is also providedwith a lower limit float switch 24a, an upper limit float switch 24b and a stop float switch 24c. These float switches are all used to control the liquid level in the low-temperature separator 23. It should, however, be noted that if the stop float switch 24c turns on in a non-stable state such as what occurs at start-up, a solenoid valve V5 is opened to prevent overflow. The low-temperature separator 23 is provided with a liquid temperature sensor 25 for detecting the temperature of the high-concentration solution contained in it. The solution from the low-temperature separator 23 is circulated through a circulation pipe K5 and the low-temperature heat exchanger 26 and a solenoid valve V4 that opens or closes the conduit are provided in that order on the circulation pipe K5, which combines with a circulation pipe K6 at a site downstream of the solenoid valve V4 so that it eventually connects to an absorber A to be described below. The low-temperature heat exchanger 26 performs heat exchange between the hot high-concentration solution from the low-temperature separator 23 that flows externally (on the drawing) and the cold low-concentration solution being supplied from the solution pump P1 that flows internally (on the drawing).

Provided on the circulation pipe K5 at a site upstream of the low-temperature heat exchanger 26 is an overflow pipe K7 that branches from the circulation pipe K5 to combine with and connect the circulation pipe K3 to be described below. The overflow pipe K7 is provided with an overflow value V5 that opens or closes the conduit; when the overflow valve V5 opens, the solution in the low-temperature separator 23 will no longer overflow to the condenser 30.

The condenser 30 is formed of a plurality of vertically erected cylindrical pipes that extend through a plurality of fins. The top end of the condenser 30 is connected via a pipe Q3 to the low-temperature separator 23 so that the steam being sent from the latter 23 is sufficiently cooled by the wind created with the cooling fan 50 to be condensed to water. The water that has liquefied in the low-temperature generator 20 flows into the condenser 30 via the pipe Q2 connected to the bottom and combines with the water condensed in the condenser 30. A refrigerant tank 31 is connected to the bottom of the condenser 30 so that the water condensed in the condenser 30 and the low-temperature generator 20 flows into the tank for temporary storage. Provided within the refrigerant tank 31 are a lower limit float switch 32a for detecting the lower limit of the liquid level and an upper limit float switch 32b for detecting the upper limit of the liquid level. A pipe Q4 extends from the bottom of the refrigerant tank 31 and connects to an evaporator E to be described below. A refrigerant pump P2 is provided on the pipe Q4 and the refrigerant pump P2 starts to run when the upper limit float switch 32b turns on by detecting the liquid level of the refrigerant tank 31 having reached the upper limit and stops running when the lower limit float switch 32a turns off by detecting the Liquid level having dropped to the lower limit. The refrigerant pump P2 not only prevents the entrance of gases into the pipe Q4 but also controls the concentration of the absorbing liquid in the overall system.

The dual pipe unit 40 is erected vertically and comprises a cold water pipe 41 serving as a passageway of the heat transfer medium (which is cold water in the case under consideration and hereunder referred to as "cold water") that is to be used in an indoor cooler (not shown) and surrounded by a coaxial outer pipe 42. The cold water pipe 41 is of a dual structure consisting of the following two parts: an evaporating pipe portion 41a that is connected integrally to an inflow pipe W1 for admitting incoming cold water from the indoor cooler and which is sealed at the bottom; and an inner pipe portion 41b that is coaxially provided within the evaporating pipe portion 41a. The bottom of the inner pipe portion 41b is open near the bottom of the evaporating pipe portion 41a whereas the top thereof penetrating the top of the evaporating pipe portion 41a is fixed to the latter in a liquid-tight manner, with the foremost end of the inner pipe portion 41b being connected integrally to an outflow pipe W2 for letting the cold water flow to the indoor cooler. A cold water circulating pump $P_W$ is provided on the inflow pipe W1 and the outflow pipe W2 is provided with a water temperature sensor $T_W$ for detecting the temperature of the cold water circulating through the pipe.

The outer pipe 42 is sealed at both top and bottom ends and has a multiple of fins 42a provided coaxially on the periphery. The cold water pipe 41 penetrates the top of the outer pipe 42 and it is fixed to the latter in a liquid-tight manner, with the bottom end thereof being spaced from the bottom end of the outer pipe 42 by a specified distance. This arrangement forms the dual pipe unit 40 having an evaporating/absorbing compartment 43 between the evaporating pipe portion 41a and the outer pipe 42.

The evaporating pipe portion 41a of the cold water pipe 41 has an annular water-receiving tray 44 within the evaporating/absorbing compartment 43 near the top end thereof in such a manner that the peripheral surface of the evaporating pipe portion 41a is surrounded with the tray. A plurality of holes (not shown) through which water is dispensed onto the outer surface of the evaporating pipe portion 41a are provided in the water-receiving tray 44 around the opening thereof near the inner edge. Provided above the water-receiving tray 44 are water dispensing pipes 46 that penetrate the top of the outer pipe 42 and which distributed via a distributor 45 provided at the tip of the pipe Q4 extending from the refrigerant tank 31. The water dispensing pipes 46, water-receiving tray 44 and the peripheral surface of the evaporating tube portion 41a combine together to make the evaporator E. The evaporating pipe portion 41a is a fluted pipe having grooves formed in the peripheral surface in both vertical and horizontal directions. This arrangement provides ease for water permeation on the peripheral surface of the evaporating pipe portion 41a so that it will drip at a slower speed to spread more easily to ensure efficient evaporation of the water flowing down the peripheral surface of the evaporating pipe portion 41a.

An annular solution-receiving tray 47 is provided on the inner peripheral surface of the outer pipe 42 in a position slightly below the water-receiving tray 44 and a plurality of holes (not shown) through which the solution is dispensed onto the inner surface of the outer pipe 42 are provided in the tray around the opening thereof near the outer edge. Provided above the solution-receiving tray 47 are solution dispensing pipes 49 that penetrate the top of the outer pipe 42 and which are distributed via a distributor 48 provided at the tip of an extension of the circulation pipe K6. The solution dispensing pipes 49, the solution-receiving tray 47 and the inner peripheral surface of the outer pipe 42 combine together to make the absorber A. The inner peripheral surface of the outer pipe 42 is also roughened by shot blasting or other suitable technique so that the solution will easily permeate said inner peripheral surface to drip at a slower speed while spreading easily. Instead of being roughened, the inner peripheral surface of the outer pipe 42 may be fitted with a lath or other types of screen. Although not shown, there are as many dual pipe units 40 as the water dispensing pipes 46 and the solution dispensing pipes 49 and they are provided parallel to one another.

Extending from the bottom wall of the dual pipe unit 49 is a circulation pipe K8 that forms a solution circulating path for supplying the low-concentration solution to the high-temperature generator 10, and the pump P1 is provided midway the circulation pipe K8. The aforementioned overflow pipes K7 and K3 are sequentially combined with and connected to the circulation pipe k8 in positions upstream of the solution pump P1. The circulation pipe K8 has a bypass pipe K9 that bypasses the solution pump P1; a bypass valve V is provided on the bypass pipe K9 to provide for adjustment of the flow of the solution. The circulation pipe K8 is also furnished with a liquid temperature sensor 51 for detecting the temperature of the solution and this is used to control both normal operation and diluting operation of the cooling apparatus. A flow sensor 52 is provided on the circulation pipe K8 in a position downstream of the solution pump P1 so as to control the ignition of the burner 12, the amount of gas supply to the burner 12 (by adjusting the flow of the low-concentration solution) and so forth. A solenoid valve V6 for opening or closing the conduit is provided near the entrance of the low-temperature heat exchanger 26. The inner pipe of the low-temperature heat exchanger 26 and that of the high-temperature heat exchanger 17 are connected by a circulation pipe K10 and the inner pipe of the high-temperature heat exchanger 17 in turn is connected to the heat exchanger 13 in the high-temperature generator 10 by a circulation pipe K11.

Provided on the circulation pipe K8 in a position slightly upstream of the solenoid valve V6 is a diluent circulating pipe KD that branches from the circulation pipe K8 to combine with the circulation pipe K6. The diluent circulating pipe KD is fitted with a diluting valve VD that opens or closes the conduit. The diluent circulating pipe KD is so designed that when the diluting valve VD opens, the circulation pipe K8 fitted with the solution pump P1 is directly connected to the absorber A via the circulation pipe K6; hence, the pipe KD is useful in a diluting operation of the cooling apparatus.

Figure 2:
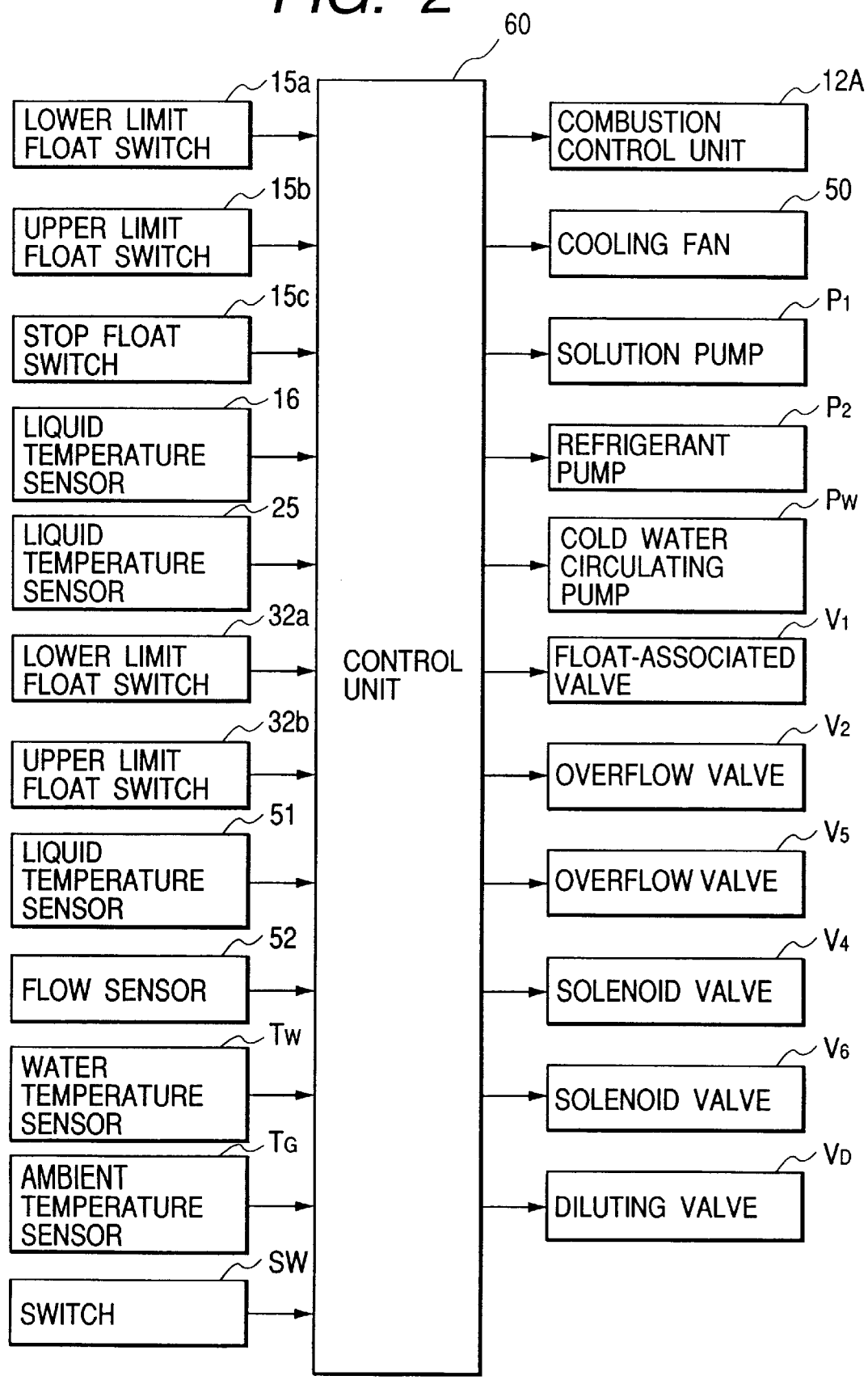
FIG. 2 is a block diagram showing the diagrammatic circuit configuration of a control unit for controlling the electrical actions of the absorption cooling apparatus.

We now describe the control unit which provides electrical control of the operation of the absorption cooling apparatus. The control unit 60 is composed of a microcomputer typically consisting of a CPU, ROM, RAM, timer and I/O and it controls the circulation of the lithium bromide solution through the above-described individual components of the cooling apparatus so that the action of water cooling in the dual pipe unit 40 is controlled appropriately. As shown in FIG. 2, the control unit 60 has the following components connected to the input side: lower limit float switch 15a; upper limit float switch 15b; stop float switch 15c; liquid temperature sensor 16; liquid temperature sensor 25; lower limit float switch 32a; upper limit float switch 32b; liquid temperature sensor 51; and flow sensor 52. In addition to these components already described above, the following additional components are connected to the input side of the control unit 60: an ambient temperature sensor TG for detecting the temperature of outdoor air; a water temperature sensor TW for detecting the temperature of cold water; and a switch SW for turning on and off the indoor cooler. To the output side of the control unit 60, the following components are connected: float-associated valve V1; overflow valves V2 and V5; solenoid valves V4 and V6; diluting valve VD; solution pump P1; refrigerant pump P2; cold water circulating pump PW; combustion control unit 12A for the burner 12; and cooling fan 50.

Having described the construction of the absorption cooling apparatus according to the first embodiment, we now discuss the operation thereof in two different modes, one being the normal operation for cooling the cold water and the other being a diluting operation in which the solution is diluted while the normal operation is off.

(1) Normal Operation

When the indoor cooler switch SW is turned on, the cold water circulating pump PW starts to supply cold water to the dual pipe unit 40. Note that the cooling apparatus does not work if the temperature of the cold water is below a preset level (which is typically 7° C.). If the temperature of the cold water exceeds the preset level, solenoid valves V4 and V6 and overflow valve V2 are opened and solution pump P1 starts to run. If the flow sensor 52 detects the required flow of the solution, the burner 12 starts combustion and the low-concentration solution is heated. The cooling fan 50 also starts to run. As a result, the lithium bromide solution of low concentration being heated in the high-temperature generator 10 gives off the vapor of water so that it is separated into steam and a medium-concentration solution in the high-temperature separator 14. The solution has the temperature thereof raised rapidly as it circulates through a short path connecting circulation pipes K1, K2, overflow pipe K3, and circulation pipes K8, K10 and K11.

When the liquid temperature sensor 16 detects that the temperature of the solution in the high-temperature separator 14 has exceeded a preset level (which is typically 70° C.), the overflow valve V2 is closed and the overflow valve V5 is opened. As a result, the medium-concentration solution flowing out of the high-temperature separator 14 is cooled in the high-temperature heat exchanger 17, then heated in the heat exchanger 22 in the low-temperature generator 20 and eventually separated into steam and a high-concentration solution in the low-temperature separator 23. The solution has the temperature thereof raised rapidly as it flows through a short path connecting circulation pipes K1, K2, K4, K5, overflow pipe K7, and circulation pipes K8, K10 and K11.

When the level of the medium-concentration solution in the high-temperature separator 14 drops to the lower limit thereof, causing the lower limit float switch 15a to turn off, the float-associated valve V5 is closed and the solution flows through the orifice portion 18. When the level of the medium-concentration solution rises to the upper limit thereof, causing the upper limit float switch 15b to turn on, the float-associated valve V1 is opened. With such actions, no steam will flow from the high-temperature separator 14 into the high-temperature heat exchanger 17 and the absorbing liquid flows smoothly through the circulation pipe K2, permitting adequate heat exchange to be performed within the high-temperature heat exchanger 17 while ensuring smooth supply of the medium-concentration solution into the low-temperature generator 20.

When the liquid temperature sensor 25 detects that the liquid temperature in the low-temperature separator 23 has exceeded a preset level (which is typically 70° C.), the overflow valve V5 is closed. Then, the high-concentration solution from the low-temperature separator 23 is cooled as it passes through the low-temperature heat exchanger 26; thereafter, the solution flows through the circulation pipes K5 and K6, is distributed by the distributor 48 and dripped on the solution receiving tray 47 from the solution dispensing pipes 49 in the absorber A so that it passes through the dispense holes to flow down the inner surface of the outer pipe 42. As a result, the heat generated when the steam serving as the heat transfer medium is absorbed by the high-concentration solution is efficiently removed by means of the cooling fan 50.

The steam flowing through the pipe Q3 from the low-temperature separator 23 is condensed to liquefy in the condenser 30 and, after passing through the refrigerant tank 31, the resulting water is forced by the refrigerant pump P2 to be supplied to the distributor 45. The water distributed by the distributor 45 is dripped on the water receiving tray 44 from the water dispensing pipes 46 in the evaporator E so that it passes through the dispense holes to flow down the outer surface of the evaporating pipe portion 41a. Since the interior of the evaporating/absorbing compartment 43 is held at reduced pressure, the dripping water evaporates and the resulting heat of vaporization cools the evaporating pipe portion 41a so that the cold water flowing into the evaporating pipe portion 41a is cooled and flows through the inner pipe portion 41b to return to the indoor cooler. The returned cold water allows the indoor cooler to run in a cooling mode. The evaporating water is absorbed by the high-concentration solution flowing down the inner surface of the outer pipe 42, whereupon the high-concentration solution is diluted to a lower concentration and discharged from the bottom of the outer pipe 42 into the circulation pipe K8. These actions are performed in succession so that the cold water circulating through the cold water pipe 41 is cooled efficiently to enable the indoor cooler to keep running in a cooling mode.

The absorption cooling apparatus is shut down if the required performance is lower than a preset level or when the indoor cooler switch SW is turned off. In either case, the gas supply channel to the burner 12 is cut off and the cooling fan 50 is turned off and, what is more, the control unit 60 performs the necessary control to reduce the amount in which the solution is supplied by the solution pump P1. Thereafter, if the liquid temperature in the low-temperature separator 23 drops below a preset level, the solution pump P1 turns off and so does the cold water circulating pump PW in the indoor cooler, causing the absorption cooling apparatus to shut down.

(2) Diluting Operation

If, after cooling apparatus's shutdown, the temperature of either the solution in the circulation pipe K8 or the outdoor air drops to present a likelihood that lithium bromide may crystallize out of the high-concentration solution in the system, a diluting operation must be performed in order to prevent the crystallizing of lithium bromide. During the diluting operation, the pressure difference between the high-temperature separator 14 and the high-temperature heat exchanger 17 decreases to such a low level that the upper limit float switch 15b turns on, causing the float-associated valve V1 to open. As a result, the low-concentration solution supplied from the solution pump P1 flows through the open conduit and, hence, the head of the high-temperature separator 14 suffices to assure an adequate flow of the absorbing liquid that enables the diluting operation to proceed smoothly. Another way to perform the diluting operation is by opening the diluting valve VD so that the diluent circulating pipe KD is connected to the circulation pipe K6.

As described on the foregoing pages, the absorption cooling apparatus according to the first embodiment of the invention has the lower and upper limit float switches 15a and 15b in combination with the float-associated valve V1 and this ensures that no steam will flow out of the high-temperature separator 14 into the high-temperature heat exchanger 11, permitting not only adequate heat exchange but also smooth operation of the cooling apparatus. During a diluting operation, the pressure difference decreases and the float-associated valve V1 opens; hence, the head of the high-temperature separator 14 suffices to assure an adequate flow of the absorbing liquid in spite of the reduced pressure difference.

These advantages are attained in the first embodiment by providing the float-associated valve and the orifice portion only at a site downstream of the high-temperature heat exchanger connected to the high-temperature separator 14 which is prone to develop a pressure difference due to the treatment of the high-temperature solution. Additional units of the float-associated valve and the orifice portion may be provided either downstream or upstream of the low-temperature heat exchanger 26 connected to the low-temperature separator 23 such that they are operatively associated with the float switches in the low-temperature separator 23; the necessity of such additional float-associated valve and orifice portion is somewhat smaller than that of the float-associated valve and orifice portion provided downstream of the high-temperature heat exchanger 17 connected to the high-temperature separator 14.

Figure 3:
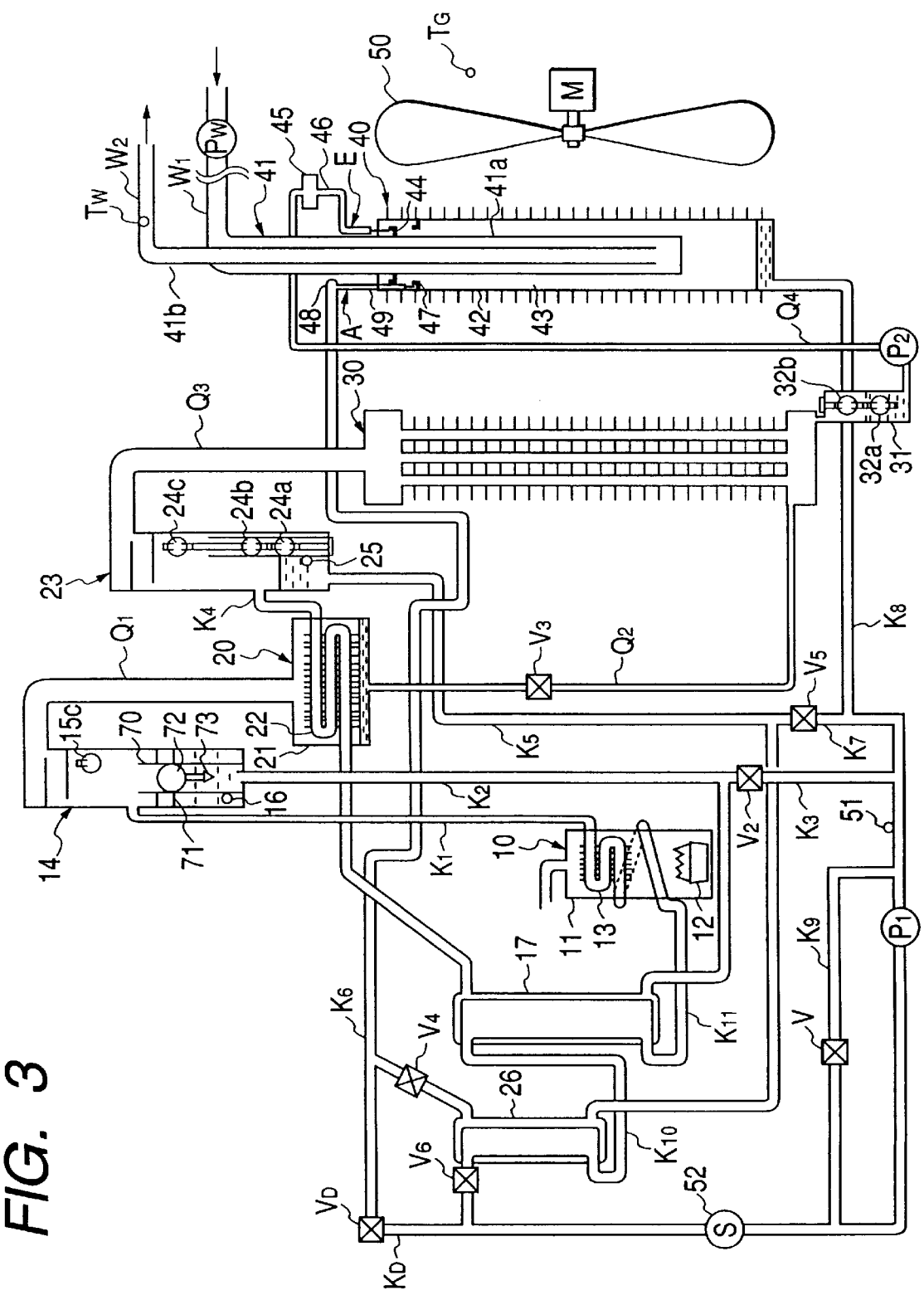
FIG. 3 is a diagrammatic representation of an absorption cooling apparatus according to the second embodiment of the present invention.
Figure 4:
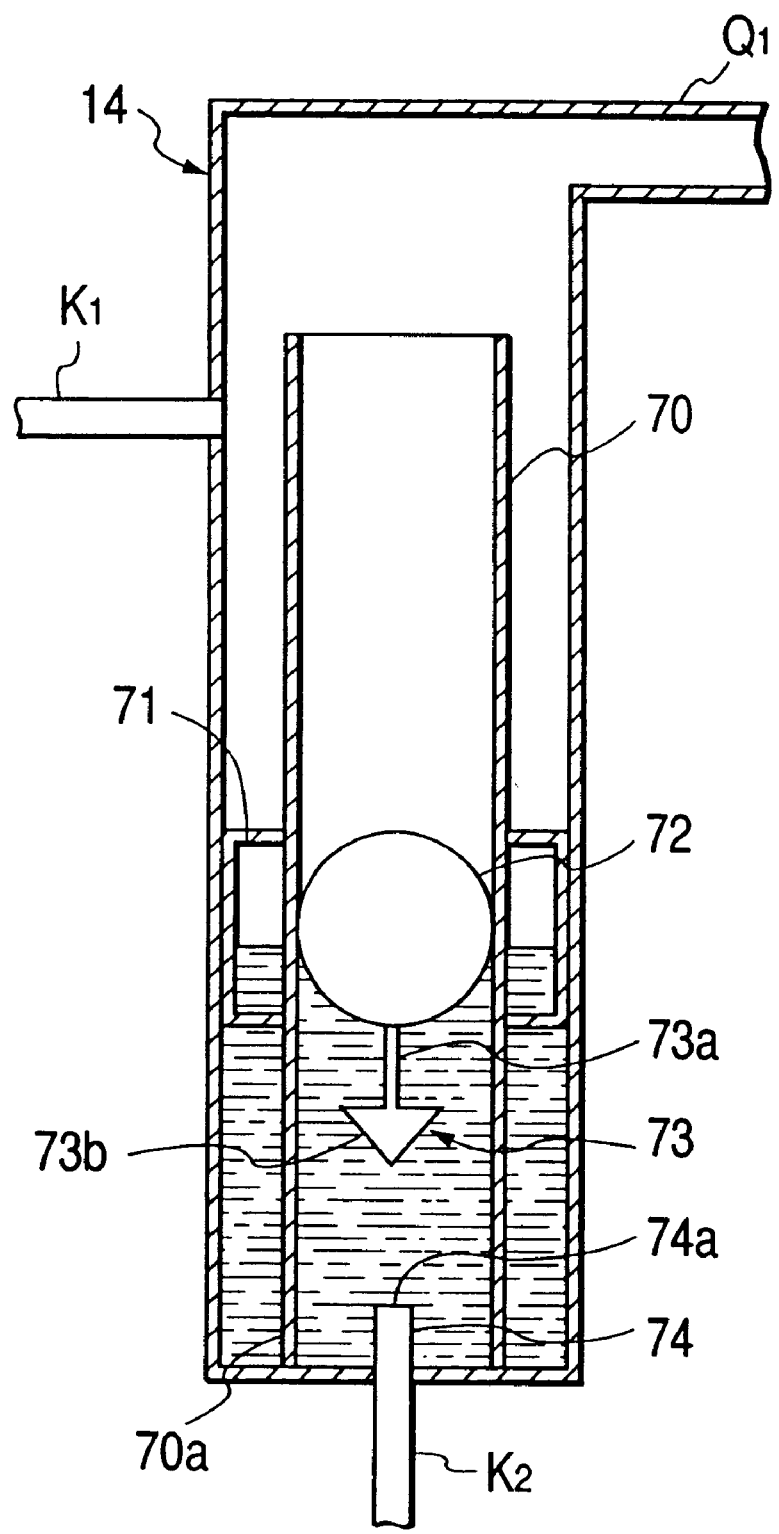
FIG. 4 is a diagrammatic sectional view of the high-temperature separator in the second embodiment.

We now describe the second embodiment of the invention with reference to accompanying drawings, particularly FIGS. 3 and 4. As shown, the absorption cooling apparatus according to the second embodiment differs from the first embodiment in the following points: it does not have the lower and upper limit float switches 15a and 15b in the high-temperature separator 14; instead, it has a cylindrical support 10 erected along the central axis of the high-temperature separator 14, with the support being surrounded by an annular spacer 71 fixed to the inner surface of the high-temperature separator 14; the support 70 contains a float 72 of about the same diameter and an outlet plugging valve 73 fixed thereto; and the float-associated valve V1 and the orifice portion 18 provided at a site downstream of the high-temperature exchanger 17 are eliminated. In addition, the joint of the circulation pipe K2 extending from the high-temperature separator 14 is allowed to project a little into the high-temperature separator 14 to form a feed-out portion 74 that terminates with a solution outlet 74a.

As shown in FIG. 4, the support 70 has liquid passage holes 70a at an end (the lower end in FIG. 4) and the spacer 71 also has holes through which the liquid passes up and down. The float 72 is a hollow spherical ball and the outlet plugging valve 73 consists of a connecting metal rod 73a and a conical valve portion 73b fixed at an end thereof in such a way that the other end of the connecting rod 73a projects radially outward from the outer surface of the float 72. The float 72 is contained in the support 70, with the outlet plugging valve 73 facing down in a vertical direction.

When the liquid level drops to the lower limit thereof, the descent of the float 72 is accompanied by the downward movement of the outlet plugging valve 73 which closes the solution outlet 74a (to be described below) with the valve portion 73b.

If the pressure difference between the high-temperature separator 14 and the high-temperature heat exchanger 17 increases during the operation the absorption cooling apparatus described above, an increased amount of the medium-concentration solution will flow from the high-temperature separator 14 into the high-temperature heat exchanger 17, causing the liquid level in the high-temperature separator 14 to drop. Then, the float 72 moves down until it drops to the lower limit of the liquid level, whereupon the valve portion 73b of the outlet plugging valve 73 in operative association with the float 72 closes the solution outlet 74a. In this way, the float 72 adjusts the liquid level in the high-temperature separator 14 such that it is always kept above the lower limit. As a result, no steam will flow out of the high-temperature separator 14 into the high-temperature heat exchanger 17, thereby assuring adequate heat exchange to be performed. During a diluting operation, the pressure difference between the high-temperature separator 14 and the high-temperature heat exchanger 17 decreases and the liquid level in the high-temperature separator 14 increases, whereupon the outlet plugging valve 73 is opened. Therefore, the head of the high-temperature separator 14 suffices to assure an adequate flow of the absorbing liquid in spite of the small pressure difference and the diluting operation can be performed smoothly. As a further advantage, no electrical control means such as solenoid valves are necessary to control the pressure difference and the intended control can be accomplished at lower cost than in the aforementioned first embodiment.

The placement of the float 72 within the support 70 has the added advantage that even if the former has a smaller diameter than the inside diameter of the high-temperature separator 14, the outlet plugging valve 73 can be lowered to the appropriate position. If the relative positions of the float 72 and the support 70 are properly adjusted, the high-concentration solution flowing through the circulation pipe K1 can be admitted into the high-temperature separator 14 while the effects of disturbances to the liquid level such as the change in the internal liquid level are reduced. It should also be noted that depending on the case, the lower and upper limit float switches 24a and 24b provided in the low-temperature separator 23 may be replaced by a float and an associated outlet plugging valve of the same types as described above.

Figure 5:
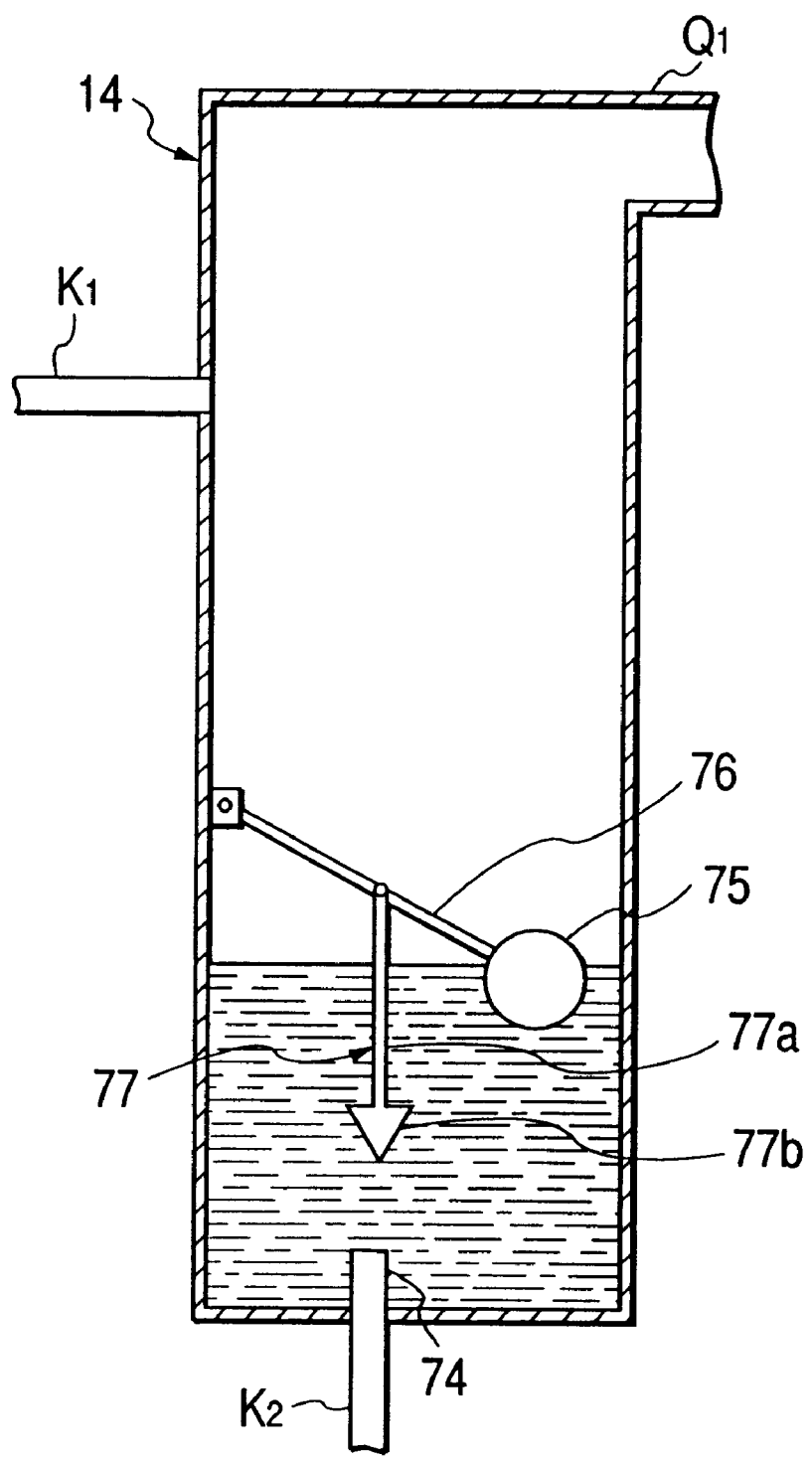
FIG. 5 is a diagrammatic sectional view of the high-temperature separator according to a first modification of the second embodiment.

The float 72 and the outlet plugging valve 73 in the second embodiment may be modified in various ways. A first modification is shown in FIG. 5. A float 75 is attached to an end of a support bar 76; the other end of the support bar 76 is attached to the inner surface of the high-temperature separator 14 such that it is vertically pivotal about the other end. An outlet plugging valve 77 consists of a connecting rod 77a and a conical valve portion 77b provided at the distal end thereof. The connecting rod 77a is attached to the support bar 76 in a position generally midway the length thereof and adapted to be movable in the same plane as the range of movement of the support bar 76. The combination of the float 75, support bar 76 and outlet plugging valve 77 produces the same advantage as the combination of the float 72 and outlet plugging valve 73 in the second embodiment.

Figure 6:
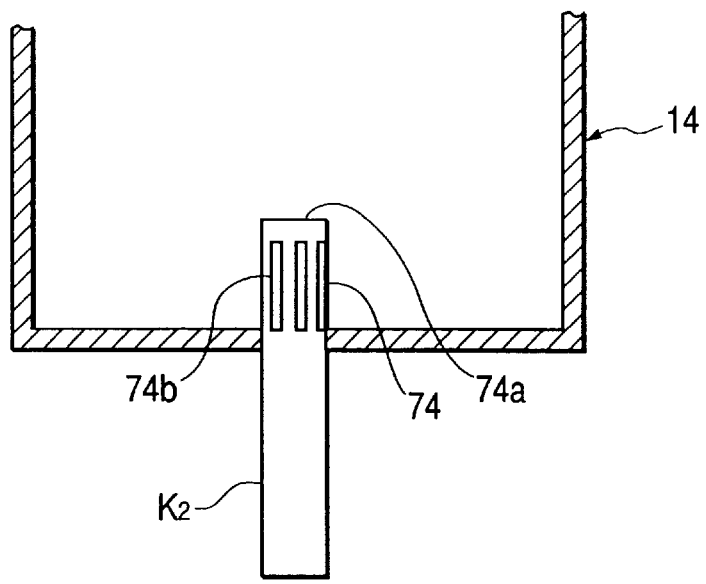
FIG. 6 is a sectional view showing the essential part of the high-temperature separator according to a second modification of the second embodiment.

A second modification is shown in FIG. 6 and essentially the same as the second embodiment and the first modification thereof, except that slits 74b are made in the feed-out portion 74 of the circulation pipe K2 which projects into the high-temperature separator 14. The slits 74b must be small enough to prevent the entrance of gas bubbles into the solution during steady-state operation. The second modification has the advantage that even if the solution outlet 74a is closed with the outlet plugging valve 73, a slight amount of the solution in the high-temperature separator 14 will flow out by passing through the slits 74b. If crystallization of lithium bromide can be a problem in the gas-liquid separator, one may provide the slits 74b and then the solution keeps flowing out in small quantities to prevent the crystallizing of lithium bromide. The slits 74b offer the added advantage of reducing the force required to open the solution outlet 74a since the feed-out portion 74 is not completely closed. In the second embodiment of the invention, the crystallizing of lithium bromide in the solution is rarely a problem to the high-temperature separator 14 since it can be solved by running the cooling apparatus in a diluting mode. However, in the low-temperature separator 23, crystallization of lithium bromide can often present with a problem and the application of the second modification to the low-temperature separator 23 will prove most effective.

Figure 7:
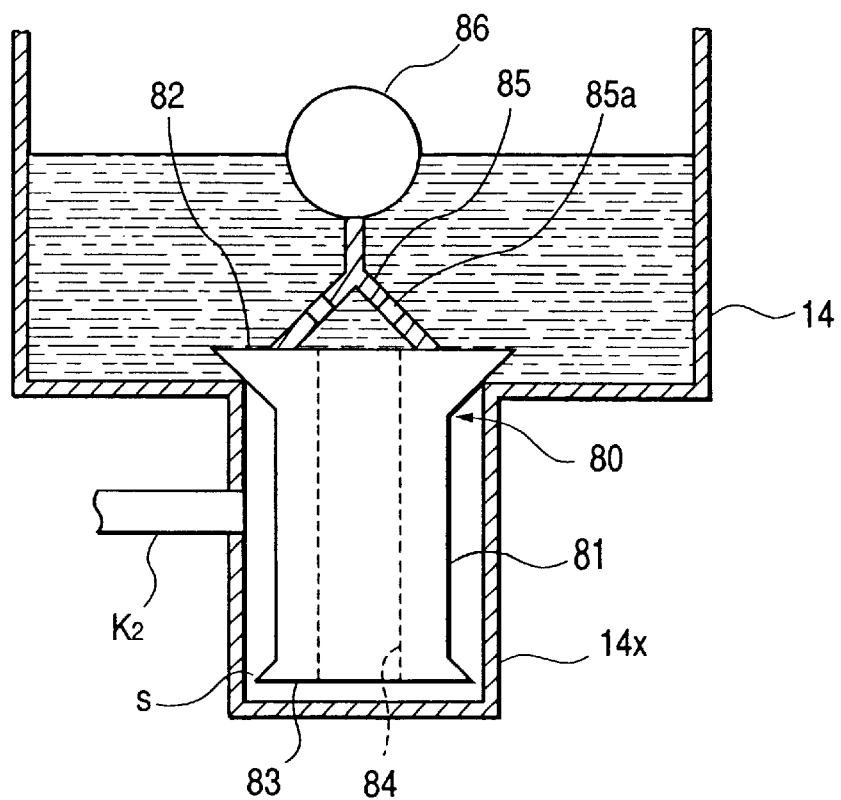
FIG. 7 is a sectional view showing the essential part of the high-temperature separator according to a third modification of the second embodiment.
Figure 8:
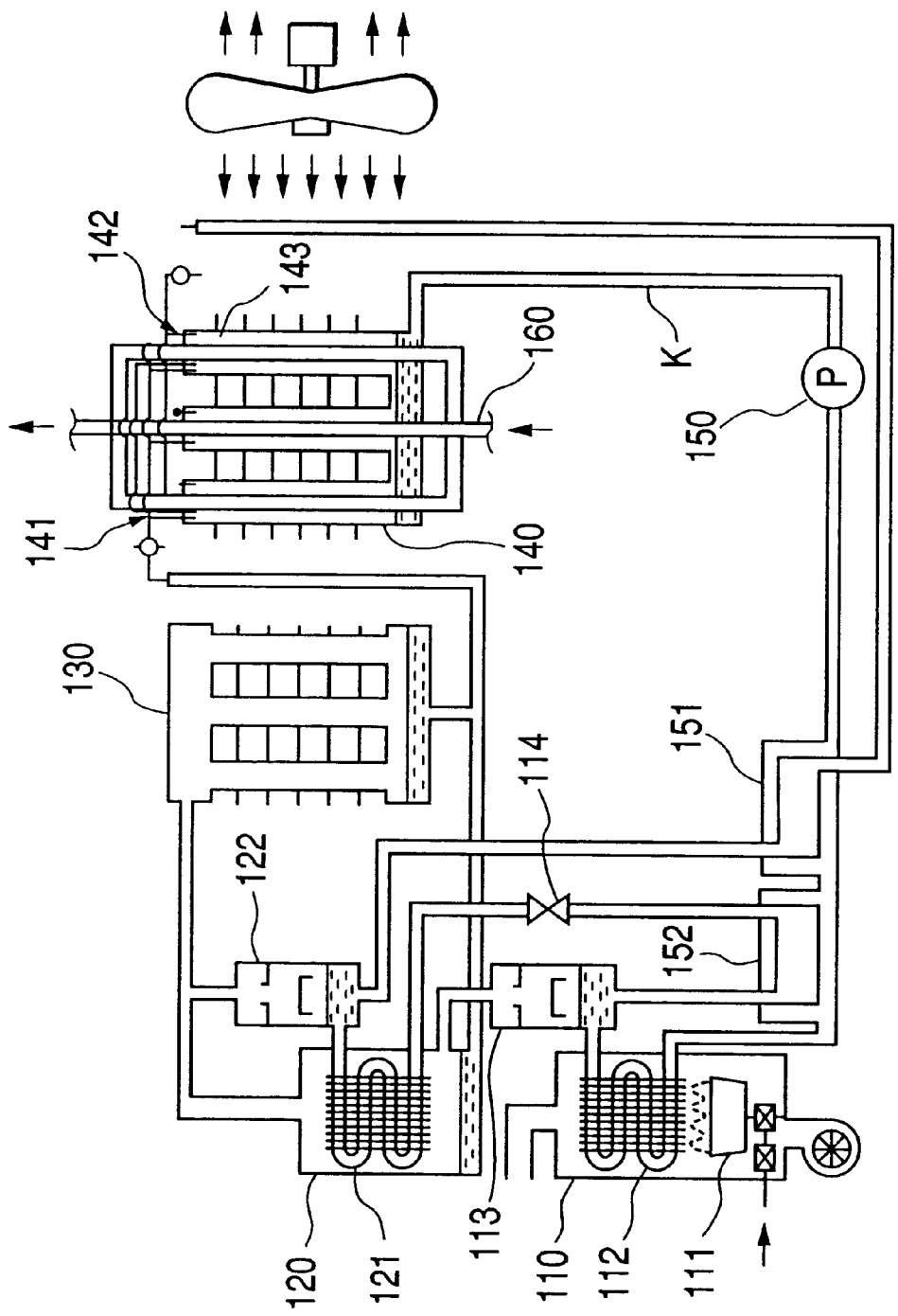
FIG. 8 is a diagrammatic representation of a prior art absorption cooling apparatus.

A third modification of the combination of the float 72 and the outlet plugging valve 73 is shown in FIG. 7. A tubular, pressure-compensating two-stage valve 80 is connected to a float 86 by means of a coupling device 85 that is fixed to an end of the valve 80 (i.e., the side where a projecting part 82 to be described below is formed) in the area around the central hole 84. A cylindrical boss 14x projects downward from the bottom wall of the high-temperature separator 14 and the two-stage valve 14 is contained in the boss. The two-stage valve 80 has two projecting parts 82 and 83 that form flanges at opposite ends of the cylindrical part 81. Each of the projecting parts 82 and 83 is of a frustoconical shape that tapers axially inward from either end, provided that the outside diameter of the projecting part 82 is larger than the inside diameter of the cylindrical boss 14x whereas the outside diameter of the projecting part 83 is slightly smaller than the inside diameter of the cylindrical boss 14x. The coupling device 85 is a hollow cone having passage holes 85a in the surface.

The two-stage valve 80, coupling device 8 and float 86 are provided on the liquid level in the high-temperature separator 14. If the liquid level drops to the lower limit thereof, the conical surface of the projecting part 82 of the two-stage valve 80 closes the opening in the cylindrical boss 14x to stop a major flow of the solution. In this case, the solution in the high-temperature separator 14 passes through the holes 85a in the coupling device 85 and the center hole 84 in the two-stage valve 80, then passes through the small gap s between the projecting part 83 and the cylindrical boss 14x, with the result that a very small amount of the solution keeps flowing out of the circulation pipe K2 at all times. The amount of the solution flowing out can be controlled by adjusting the size of the gap s. As in the second modification, the crystallizing of lithium bromide out of the solution in the gas-liquid separator 14 can be effectively prevented in the third modification.

If the two-stage valve 80 works as a float on its own, the coupling device 85 and the float 86 can be eliminated from the third modification.

In each of the embodiments described above, the high-temperature generator 10 and the high-temperature separator 14 are combined with the low-temperature generator 20 and the low-temperature separator 23. If desired, the low-temperature generator and separator can be omitted. It should also be noted that the embodiments and modifications described above are not the sole designs of the absorption cooling apparatus of the present invention and various other modifications are possible without departing from the spirit and scope of the invention, as exemplified by use of sensors other than float switches for liquid level detection, changing the construction of the dual pipe unit, and separating the evaporator from the absorber.

The absorption cooling apparatus according to aspect 1 has the advantage that during normal operation, the flowing of steam from the gas-liquid separator into the heat exchanging unit can be prevented to ensure smooth passage of the solution whereas in a diluting operation, the head of the gas-liquid separator suffices to ensure an adequate flow of the solution in spite of the small pressure difference, thereby assuring the diluting operation to proceed smoothly. The absorption cooling apparatus according to aspect 2 retains these advantages and yet it offers the added advantage of realizing a simplified construction of the absorption cooling apparatus at a lower cost by ensuring that an adequate amount of the solution is supplied through the orifice portion during a steady-state operation so that an associated on-off valve is controlled upon detection of the rise or fall of the liquid level. The absorption cooling apparatus according to aspect 3 also retains the advantages of aspect 1 and yet it allows the passage of the solution through the heat exchanging unit to be controlled at a lower cost since there is no need to use any electrical control means such as solenoid valves. If a gap is provided at the absorbing liquid outlet, the crystallizing of the solute in the gas-liquid separator can be prevented (see aspect 4).

What is claimed is:

1. An absorption cooling apparatus comprising:

a pump for supplying in circulation an absorbing liquid of high refrigerant content;

a generator for heating the absorbing liquid supplied from said pump;

a gas-liquid separator with which said absorbing liquid heated with said generator is separated into an absorbing liquid of low refrigerant content and a refrigerant vapor;

a heat exchanging unit for performing heat exchange between the absorbing liquid separated by said gas-liquid separator and the absorbing liquid which is yet to flow into said generator;

a cooling section in which the liquid refrigerant obtained by liquefying said refrigerant vapor is dispensed onto the outer surface of a heat transfer medium circulating pipe so that the latter is cooled by the evaporation of said liquid refrigerant;

an absorbing section in which the absorbing liquid of low refrigerant content supplied from said generator is dispensed to absorb the resulting refrigerant vapor; and an active solution quantity adjusting means by which the quantity of the absorbing liquid flowing out of said gas-liquid separator is adjusted in accordance with the quantity of the solution therein.

2. An absorption cooling apparatus comprising:

a pump for supplying in circulation an absorbing liquid of high refrigerant content;

a generator for heating the absorbing liquid supplied from said pump;

a gas-liquid separator with which said absorbing liquid heated with said generator is separated into an absorbing liquid of low refrigerant content and a refrigerant vapor;

a heat exchanging unit for performing heat exchange between the absorbing liquid separated by said gas-liquid separator and the absorbing liquid which is yet to flow into said generator;

a cooling section in which the liquid refrigerant obtained by liquefying said refrigerant vapor is dispensed onto the outer surface of a heat transfer medium circulating pipe so that the latter is cooled by the evaporation of said liquid refrigerant;

an absorbing section in which the absorbing liquid of low refrigerant content supplied from said generator is dispensed to absorb the resulting refrigerant vapor;

a liquid level detecting means for detecting the level of the liquid within said gas-liquid separator;

an orifice portion on an absorbing liquid passageway extending from said gas-liquid separator which is provided either upstream or downstream of said heat exchanging unit;

an on-off valve provided parallel to said orifice portion; and an on-off valve control means which controls said on-off valve in such a way that said on-off valve is closed when said liquid level detecting means detects the lower limit of the liquid level whereas said on-off valve is opened when the upper limit of the liquid level is detected.

3. An absorption cooling apparatus comprising:

a pump for supplying in circulation an absorbing liquid of high refrigerant content;

a generator for heating the absorbing liquid supplied from said pump;

a gas-liquid separator with which said absorbing liquid heated with said generator is separated into an absorbing liquid of low refrigerant content and a refrigerant vapor;

a heat exchanging unit for performing heat exchange between the absorbing liquid separated by said gas-liquid separator and the absorbing liquid which is yet to flow into said generator;

a cooling section in which the liquid refrigerant obtained by liquefying said refrigerant vapor is dispensed onto the outer surface of a heat transfer medium circulating pipe so that the latter is cooled by the evaporation of said liquid refrigerant; and an absorbing section in which the absorbing liquid of low refrigerant content supplied from said generator is dispensed to absorb the resulting refrigerant vapor, a float moving up and down in response to the variations in the level of the absorbing liquid in said gas-liquid separator; and an outlet plugging valve which is operatively associated with said float to close the absorbing liquid outlet of said gas-liquid separator when the level of said absorbing liquid has dropped to the lower limit thereof.

4. The absorption cooling apparatus according to claim 3, wherein a gap through which the absorbing liquid leaks is provided in that part of the absorbing liquid outlet portion which contacts said outlet plugging valve.

* * * * *